United States Patent
De Barros et al.

(10) Patent No.: US 6,859,585 B1
(45) Date of Patent: Feb. 22, 2005

(54) OPTICAL FILTER

(75) Inventors: Carlos De Barros, Boulogne-Billancourt (FR); Lionel Provost, Marcoussis (FR); Marianne Molina, Paris (FR); Isabelle Riant, Orsay (FR); Laurent Gasca, Villebon sur Yvette (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/601,864

(22) Filed: Jun. 24, 2003

(30) Foreign Application Priority Data

Jul. 8, 2002 (FR) .............................. 02 08544

(51) Int. Cl.⁷ ................................. G02B 6/34

(52) U.S. Cl. .................... 385/37; 385/123; 385/124

(58) Field of Search ........................ 385/15, 31, 32, 385/37, 123, 124, 147; 359/563, 566, 569, 571, 652; 398/85

(56) References Cited

U.S. PATENT DOCUMENTS

| | | | |
|---|---|---|---|
| 6,005,999 A | 12/1999 | Singh et al. | |
| 6,009,222 A | 12/1999 | Dong et al. | |
| 6,292,606 B1 | 9/2001 | Riant et al. | |
| 6,351,588 B1 * | 2/2002 | Bhatia et al. | ............... 385/37 |
| 2002/0186944 A1 * | 12/2002 | Riant et al. | ............... 385/127 |
| 2003/0016912 A1 * | 1/2003 | Riant et al. | ............... 385/37 |

FOREIGN PATENT DOCUMENTS

EP  1160596 A1  12/2001

OTHER PUBLICATIONS

K. Oh et al, "Suppression of cladding mode coupling in Bragg grating using $GE_2O$–$B_2O_3$ codoped photosensitive cladding optical fibre", Electronics Letters, IEEE Stevenage, GB, vol. 35, No. 5, Mar. 4, 1999, pp. 423,424, XP006011836.

M. J. Holmes et al, "Novel Fibre Design for Narrow–band Symmetric Response Sidetap Filters with Suppressed Leaky Mode Resonance", $25^{th}$ European Conference on Optical Communication (ECOC'99). Nice, France, Sep. 27–30, 1999, vol. 1 of II, Sep. 26, 1999, pp. 1–216, 1–217, XP0001004571.

C. W. Haggans et al, "Narrow–Band Rejection Filters with Negligible Back Reflection Using Tilted Photo Inducted Gratings in Single–Mode Fibers", IEEE Photonics Technology Letters, IEEE, Inc. < NY, US, vol. 10, No. 5, May 1, 1998, pp. 690–692, XP000754661.

* cited by examiner

*Primary Examiner*—Brian Healy
*Assistant Examiner*—Christopher M. Kalivoda
(74) *Attorney, Agent, or Firm*—Sughrue Mion, PLLC

(57) ABSTRACT

An optical filter comprising a slanted Bragg grating inscribed in an optical fiber portion comprising a core having a refractive index $n_1$ and a radius $R_{core}$ and a cladding having an average refractive index $n_2$ lower than $n_1$ and a radius $R_{cladding}$, the core and the cladding of the fiber being doped with a photosensitive dopant in the fiber portion comprising the Bragg grating, which filter is characterized in that, in the fiber portion comprising the Bragg grating, the photosensitivity of the cladding is greater than the photosensitivity of the core and the cladding includes an index step area having a refractive index $n_3$ greater than $n_2$ and less than $n_1$, said index step area having a width L defined by an inside radius $R_{s1}$ greater than or equal to the radius $R_{core}$ of the core and an outside radius $R_{s2}$ less than or equal to the radius $R_{cladding}$ of the cladding.

10 Claims, 3 Drawing Sheets

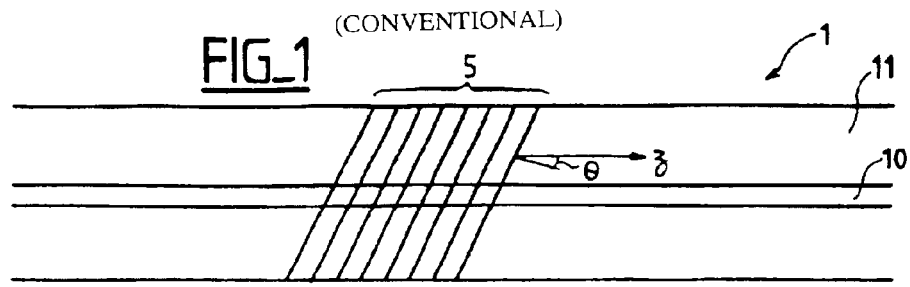
FIG_1 (CONVENTIONAL)
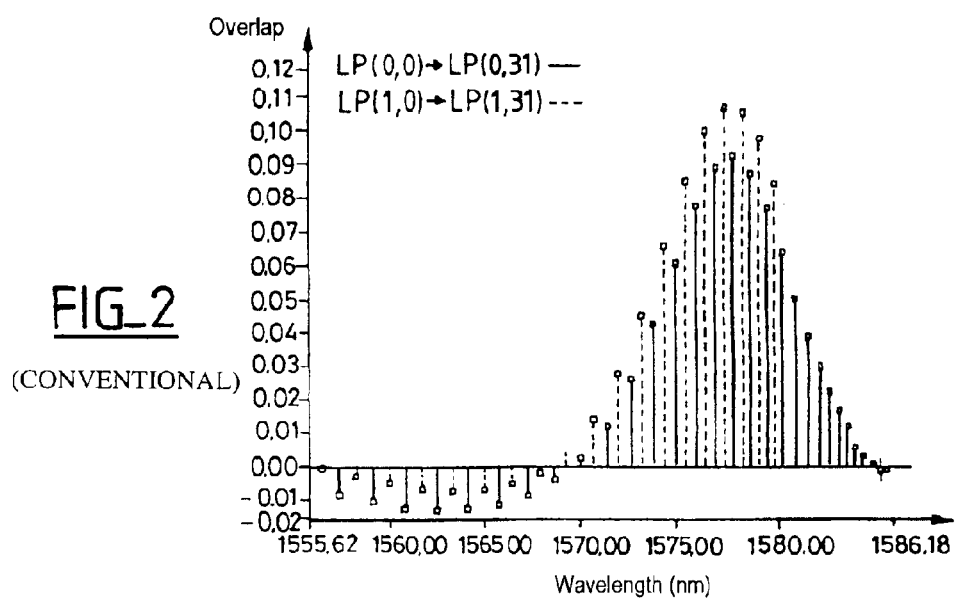
FIG_2 (CONVENTIONAL)
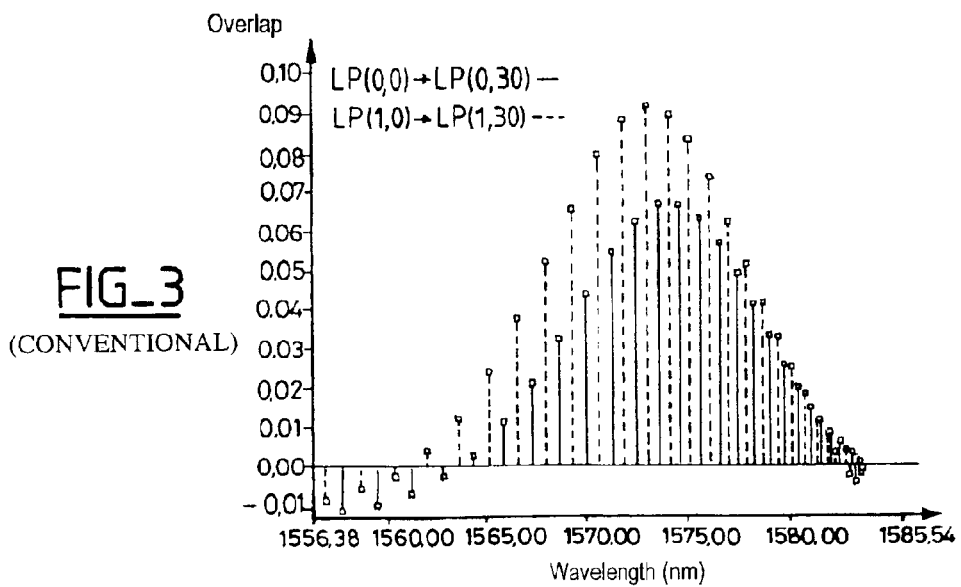
FIG_3 (CONVENTIONAL)

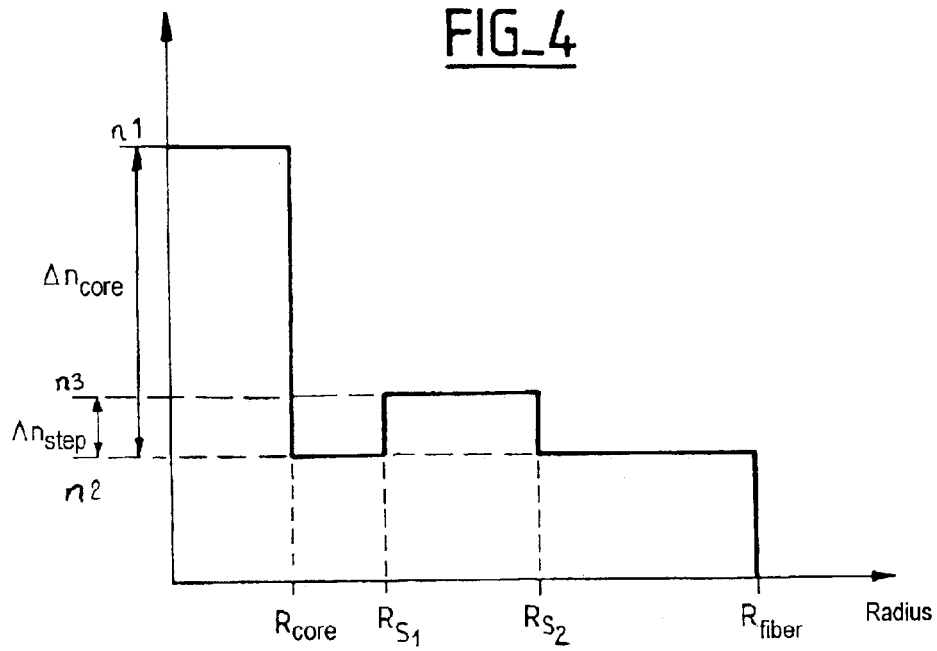
FIG_4
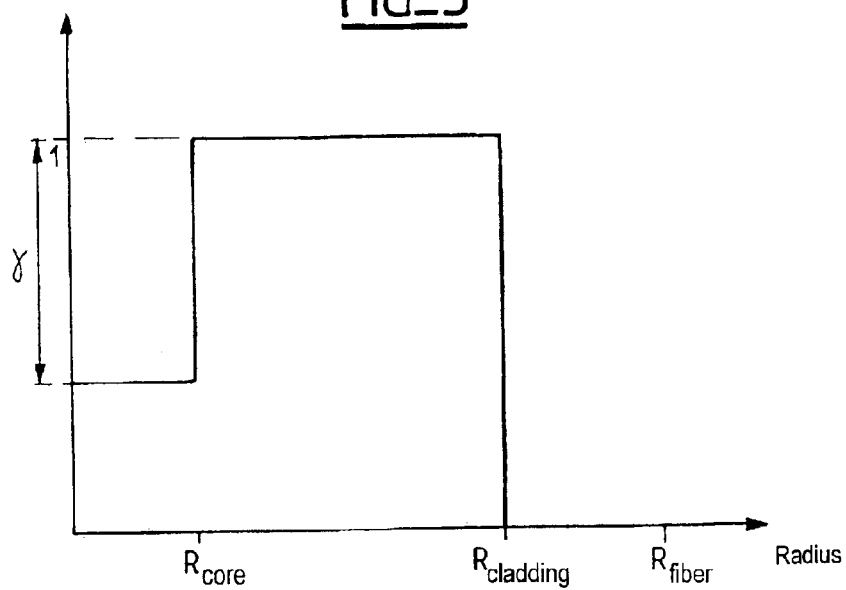
FIG_5

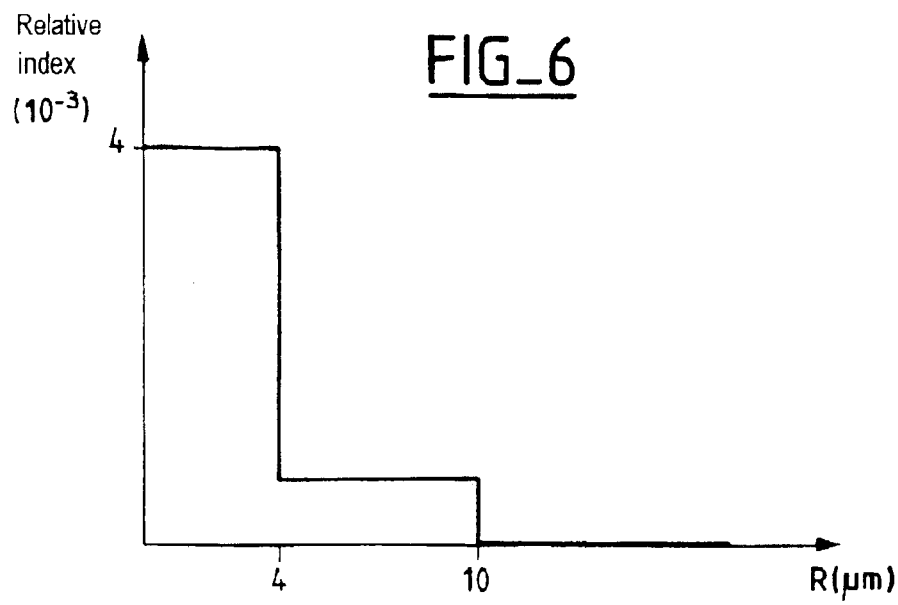
FIG_6
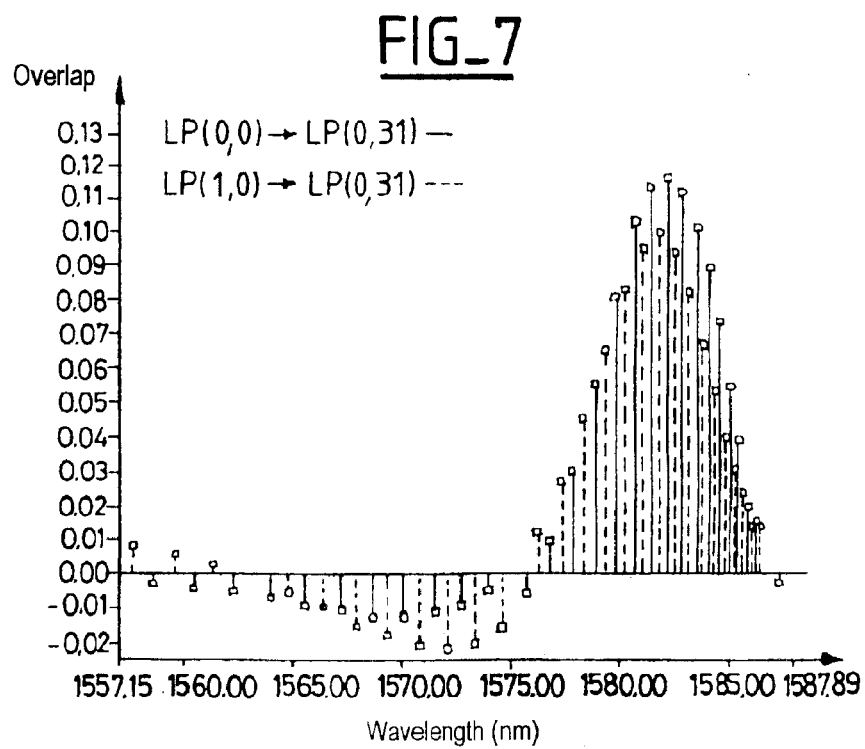
FIG_7

OPTICAL FILTER

The field of the present invention is that of optical filters and especially dissipative filters such as gain flattening filters (GFF).

BACKGROUND OF THE INVENTION

Gain flattening filters are generally associated with optical amplifiers disposed in optical repeaters distributed regularly along transmission lines. Optical amplifiers do not usually apply equal amplification to all wavelengths of the signals transmitted on the various channels of the same transmission line. In particular, the development of dense wavelength division multiplexing (DWDM) transmission applications has tended to accentuate the amplification disparities over a given pass-band. It has therefore become necessary to produce gain flattening filters offering high contrast over narrow spectral bands to achieve perfect matching to the gain curve of in-line amplifiers, which are usually doped fiber amplifiers.

Gain flattening filters usually consist of Bragg gratings inscribed optically into optical fibers. An optical fiber conventionally comprises a core, whose function is to transmit and possibly to amplify an optical signal, surrounded by one or more cladding layers, whose function is to confine the optical signal in the core. To this end the refractive index $n_1$ of the core and the refractive index $n_2$ of the cladding are such that $n_1 > n_2$. As is well-known to the person skilled in the art, the propagation of an optical signal in a fiber involves the propagation of a fundamental mode in the core and the propagation of secondary modes in the cladding.

To make it photosensitive, for inscribing a Bragg grating, the core and/or the cladding of the fiber can be doped, for example with germanium (Ge). The gratings conventionally used for gain flattening are slanted Bragg gratings (SBG). As shown in FIG. 1, in a slanted Bragg grating 5 the refractive index in the core 10 and/or the cladding 11 of a fiber portion 1 is modulated. The grating inscription angle θ is defined by the inclination of the optically inscribed index modulation to the propagation axis z of the optical signal and must be chosen to enable coupling of the fundamental mode into the cladding modes.

FIG. 2 shows the spectral response of a conventional SBG filter of the kind shown in FIG. 1. The parameters influencing the spectral response of an SBG filter include the inscription angle θ and the index step $\Delta n_{core} = n_1 - n_2$ between the core and the cladding of the fiber; θ=3.6° and $\Delta n_{core}$=0.004 in the example shown.

DWDM applications require increasingly narrow filters offering increasingly accentuated contrasts.

In the case of an SBG filter, the best solution to reducing the spectral width of the filter whilst reducing reflection (caused by coupling of the fundamental mode to its contra-propagating self) is to improve the coupling between the fundamental mode and the cladding modes in order to increase significantly the integral of the overlap between the two modes. The overlap integral is defined as the area defined by the fundamental modes and the cladding modes weighted by the photosensitivity profile of the fiber.

Various prior art techniques have already been proposed for increasing the overlap area in a filter inscribed optically into a fiber portion.

A first prior art solution consists in increasing the diameter of the core or reducing the index step $\Delta n_{core}$ between the core and the cladding to widen the fundamental mode and thereby increase the overlap. However, this solution is limited by the loss of the monomode nature of the propagation of the signal if the diameter of the core becomes too large or by problems of coupling with the other optical components of the module.

A second prior art solution consists in making the cladding photosensitive as well as the core, to increase the weighting of the overlap area. However, this solution implies inscribing the Bragg grating with a large slant angle (at least 60) to prevent coupling of the fundamental mode to itself and thus total reflection of the signal.

For example, patent application WO 99/27401 describes an optical filter comprising a slanted grating inscribed in a fiber portion having a buried cladding, i.e. a cladding portion whose index is lower than that of silica, the cladding further being at least partly photosensitive, although less photosensitive than the core.

Another solution to reducing the spectral width of an SBG filter is to reduce the grating inscription angle. However, this solution is limited by the minimum angle required to guarantee non-reflection of the optical signal and to avoid the need for optical isolators, which are essential in the case of zero-back-reflection angle Bragg grating filters.

What is more, the problem of finding a filter having a reduced spectral width is compounded by the problem of the tolerance of the component to bending losses. Because of the trend for miniaturization of components, optical modules are increasingly compact and the fiber portions disposed in them are generally coiled or looped so that they occupy a small space. A filter inscribed optically in a fiber portion intended to be disposed in an optical module must therefore have some tolerance to bending losses.

A conventional solution to reducing bending losses in a fiber is to increase the index difference between the core and the cladding, that is to say to increase the index step $\Delta n_{core} = n_1 - n_2$.

However, a consequence of increasing the index step is to confine further the fundamental mode in the core, which then necessitates increasing the inscription angle in order to preserve a non-reflective filter. Increasing the inscription angle of the grating widens the spectral response of the filter. FIG. 3 illustrates this problem and represents the spectral response of an SBG filter inscribed in a fiber having an accentuated index step $\Delta n_{core}$=0.0055 and an inscription angle θ=5°. Comparing FIGS. 2 and 3, it is seen that the spectral response of the filter has been widened, to the detriment of reducing bending losses.

One solution to reducing the inscription angle of an SBG whilst maintaining a high index step is described in the paper "Ultra narrow band optical fiber sidetap filter" by M. J. Holmes et al., *ECOC'98*. That kind of solution consists in making the cladding photosensitive and reducing the photosensitivity of the core, even to the point of the core having no photosensitivity.

This solution prevents coupling of the fundamental mode to itself in gratings with smaller angles. However, because the core is less photosensitive, the overlap and therefore the coupling of the fundamental mode with the cladding modes is greatly reduced. Also, the inscription angle to guarantee non-reflection depends on the difference in photosensitivity between the core and the cladding and the width of the mode, and is not easy to reproduce.

OBJECT AND SUMMARY OF THE INVENTION

The object of the present invention is to solve this two-fold problem of limiting bending losses and providing a narrow spectral response in the same filter. The objective of the invention is thus to propose an optical filter in an optical fiber that achieves a high contrast over a narrow pass-band with reduced bending losses in order to correspond as closely as possible to the gain curve of a given amplifier.

To this end, the invention proposes to inscribe a slanted Bragg grating in a fiber portion that has a photosensitivity profile combined with a refractive index profile such that the coupling of the fundamental mode to the cladding modes is high whilst bending losses in the grating are minimized.

In particular, the index step between the core and the cladding is maintained, the cladding has an index step, and the photosensitivity of the cladding is greater than that of the core.

To be more specific, the present invention provides an optical filter comprising a slanted Bragg grating inscribed in an optical fiber portion comprising a core having a refractive index $n_1$ and a radius $R_{core}$ and a cladding having an average refractive index $n_2$ lower than $n_1$ and a radius $R_{cladding}$, the core and the cladding of the fiber being doped with a photosensitive dopant in the fiber portion comprising the Bragg grating, which filter is characterized in that, in the fiber portion comprising the Bragg grating, the photosensitivity of the cladding is greater than the photosensitivity of the core and the cladding includes an index step area having a refractive index $n_3$ greater than $n_2$ and less than $n_1$, said index step area having a width L defined by an inside radius $R_{s1}$ greater than or equal to the radius $R_{core}$ of the core and an outside radius $R_{s2}$ less than or equal to the radius $R_{cladding}$ of the cladding.

The index difference ($\Delta n_{core}=n_1-n_2$) between the core and the cladding is preferably in the range 0.003 to 0.006 and the index difference ($\Delta n_{step}=n_3-n_2$) between the cladding and the index step area is preferably in the range 0.0004 to 0.001.

Depending on the embodiment, the index step area has a width ($L=R_{s2}-R_{s1}$) in the range 4 micrometers ($\mu$m) to 20 $\mu$m and the inside radius $R_{s1}$ of the index step area of the cladding is in the range from the radius $R_{core}$ of the core of the fiber to $R_{core}+10$ $\mu$m.

The invention finds an application in optical gain flattening filters including one or more filters of the invention.

BRIEF DESCRIPTION OF THE DRAWINGS

The features and advantages of the present invention become more clearly apparent on reading the following description, which is given by way of illustrative and non-limiting example and with reference to the appended drawings, in which:

FIG. 1, already described, is a diagram of a slanted grating inscribed in a fiber portion, FIG. 2, already described, shows the spectral response of a filter inscribed in a conventional fiber, FIG. 3, already described, shows the spectral response of a filter inscribed in a fiber with an accentuated index step, FIG. 4 shows diagrammatically the index profile of a guide portion including a filter of the invention, FIG. 5 shows diagrammatically the photosensitivity profile of a fiber portion including a filter of the invention, FIG. 6 shows diagrammatically one example of an index profile of a fiber portion including a filter of the invention, and FIG. 7 shows the spectral response of the FIG. 6 filter.

MORE DETAILED DESCRIPTION

According to the invention, a filter is produced by inscribing a slanted Bragg grating in a fiber portion having a suitable index profile (FIG. 4) associated with a suitable photosensitivity profile (FIG. 5). The fiber has a core with an index $n_1$ and a radius $R_{core}$ surrounded by a cladding with an index $n_2$ and a radius $R_{cladding}$.

In particular, according to the invention, the index profile features an index step $\Delta n_{core}$ between the core and the cladding and an index step $\Delta n_{step}$ in a portion of the cladding. This kind of index profile guarantees good guidance of the signal, even in bends. The index step $\Delta n_{core}$ between the core and the cladding is advantageously in the range 0.003 to 0.006 and the index step $\Delta n_{step}$ in the cladding is advantageously in the range 0.0004 to 0.001.

The index step $\Delta n_{step}$ in the cladding is in an area defined by two radii $R_{s1}$ and $R_{s2}$ of the fiber. The width $L=R_{s2}-R_{s1}$ of this index step area is advantageously from 4 $\mu$m to 20 $\mu$m for a conventional fiber with a core radius $R_{core}=4$ $\mu$m, and the inside radius $R_{s1}$ of the cladding index step area is advantageously from the core radius $R_{core}$ of the fiber to $R_{core}+10$ $\mu$m.

Moreover, in the fiber portion having the above kind of index profile, the photosensitivity of the cladding is greater than that of the core, to enable inscribing a grating with a reduced angle. The photosensitivity ratio γ between the core and the cladding is in the range 0 to 1 (γ=core photosensitivity/cladding photosensitivity).

FIG. 6 shows one example of an index profile of a fiber portion including a filter of the invention. A fiber having a core radius $R_{core}=4$ $\mu$m and an index difference $\Delta n_{core}=0.004$ between the core and the cladding has an index step $\Delta n_{step}=0.0007$ in the cladding with $R_{s1}=R_{core}$ and $R_{s2}=10$ $\mu$m. The above kind of fiber profile widens the fundamental mode without modifying the diameter of the core.

FIG. 7 shows that the spectral response of a filter inscribed in the above kind of fiber portion is narrowed compared to the spectral responses shown in FIGS. 2 and 3.

Moreover, the bending losses over the above kind of fiber portion are limited for a radius of curvature of 30 millimeters (mm), the losses are from 0.02 decibels (db) at 1550 nanometers (nm), as against 0.24 dB for the same fiber with no index step in the cladding.

What is claimed is:

1. An optical filter comprising a slanted Bragg grating inscribed in an optical fiber portion comprising a core having a refractive index $n_1$ and a radius $R_{core}$ and a cladding having an average refractive index $n_2$ lower than $n_1$ and a radius $R_{cladding}$, the core and the cladding of the fiber being doped with a photosensitive dopant in the fiber portion comprising the Bragg grating, which filter is characterized in that, in the fiber portion comprising the Bragg grating, the photosensitivity of the cladding is greater than the photosensitivity of the core and the cladding includes an index step area having a refractive index $n_3$ greater than $n_2$ and less than $n_1$, said index step area having a width L defined by an inside radius $R_{s1}$ greater than or equal to the radius $R_{core}$ of the core and an outside radius $R_{s2}$ less than or equal to the radius $R_{cladding}$ of the cladding.

2. An optical filter according to claim 1, characterized in that the index difference between the core and the cladding ($\Delta n_{core}=n_1-n_2$) is in the range 0.003 to 0.006.

3. An optical fiber according to claim 1, characterized in that the index difference between the cladding and the index step area ($\Delta n_{step}=n_3-n_2$) is in the range 0.0004 to 0.001.

4. An optical filter according to claim 1, characterized in that the width of the index step area ($L=R_{s2}-R_{s1}$) is in the range 4 $\mu$m to 20 $\mu$m.

5. An optical filter according to claim 1, characterized in that the inside radius $R_{s1}$ of the index step area of the cladding is in the range from the radius $R_{core}$ of the core of the fiber to $R_{core}+10$ µm.

6. An optical gain flattening filter including an optical filter comprising a slanted Bragg grating inscribed in an optical fiber portion comprising a core having a refractive index $n_1$ and a radius $R_{core}$ and a cladding having an average refractive index $n_2$ lower than $n_1$ and a radius $R_{cladding}$, the core and the cladding of the fiber being doped with a photosensitive dopant in the fiber portion comprising the Bragg grating, which filter is characterized in that, in the fiber portion comprising the Bragg grating, the photosensitivity of the cladding is greater than the photosensitivity of the core and the cladding includes an index step area having a refractive index $n_3$ greater than $n_2$ and less than $n_1$, said index step area having a width L defined by an inside radius $R_{s1}$ greater than or equal to the radius $R_{core}$ of the core and an outside radius $R_{s2}$ is less than or equal to the radius $R_{cladding}$ of the cladding.

7. An optical filter according to claim 1, characterized in that the outside radius $R_{s2}$ is less than the radius $R_{cladding}$ of the cladding.

8. An optical filter according to claim 1, characterized in that the photosensitivity of said index step area is greater than the photosensitivity of the core.

9. An optical gain flattening filter according to claim 6, characterized in that the outside radius $R_{s2}$ less than the radius $R_{cladding}$ of the cladding.

10. An optical gain flattening filter according to claim 6, characterized in that the photosensitivity of said index step area is greater than the photosensitivity of the core.

* * * * *